US010486725B2

United States Patent
Bacallao

(10) Patent No.: US 10,486,725 B2
(45) Date of Patent: Nov. 26, 2019

(54) SHOPPING CART BAGGING STATION AND METHOD OF FORMING THE SAME

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/238,705

(22) Filed: Jan. 3, 2019

(65) Prior Publication Data
US 2019/0135322 A1    May 9, 2019

Related U.S. Application Data

(62) Division of application No. 15/383,170, filed on Dec. 19, 2016, now Pat. No. 10,220,866.
(Continued)

(51) Int. Cl.
*B62B 3/10* (2006.01)
*B65B 67/12* (2006.01)
(Continued)

(52) U.S. Cl.
CPC ............. *B62B 3/106* (2013.01); *A47F 9/042* (2013.01); *B62B 3/1464* (2013.01); *B65B 67/1227* (2013.01); *B65B 67/1266* (2013.01)

(58) Field of Classification Search
CPC ........ B62B 3/106; B62B 3/1464; A47F 9/042
See application file for complete search history.

(56) References Cited

U.S. PATENT DOCUMENTS 259,932 A     6/1882 Sims
370,563 A     9/1887 Simmons
(Continued)

FOREIGN PATENT DOCUMENTS

AU    1142402 A1    4/2002
AU    2002364902 A1    5/2004
(Continued)

OTHER PUBLICATIONS

Search Report in GB Patent Application No. GB1713267.1, dated Dec. 22, 2017; 5 pages.
(Continued)

*Primary Examiner* — Derek J Battisti
(74) *Attorney, Agent, or Firm* — Schmeiser, Olsen & Watts LLP; Karen E. Jachimowicz

(57) ABSTRACT

Disclosed is a shopping cart bagging station that couples to a shopping cart, and can be used by customers to bag their purchases as they shop. The shopping cart bagging station can be made from recyclable materials and is lightweight and portable. The shopping cart bagging station can be supplied as a kit, where the kit includes a sheet of rigid material, with each of the shopping cart elements outlined with perforated lines in the sheet of rigid material. The shopping cart bagging station is constructed by separating elements along the perforated lines, and then fitting the shopping cart bagging station elements together to form the shopping cart bagging station. The shopping cart bagging station elements fit together with slot joints formed by connecting slots in the elements. The customer can separate the shopping cart bagging station elements and construct the shopping cart bagging station themselves.

11 Claims, 4 Drawing Sheets

Related U.S. Application Data

(60) Provisional application No. 62/402,475, filed on Sep. 30, 2016, provisional application No. 62/377,135, filed on Aug. 19, 2016, provisional application No. 62/377,143, filed on Aug. 19, 2016, provisional application No. 62/298,011, filed on Feb. 22, 2016, provisional application No. 62/298,017, filed on Feb. 22, 2016, provisional application No. 62/270,873, filed on Dec. 22, 2015, provisional application No. 62/270,827, filed on Dec. 22, 2015, provisional application No. 62/270,785, filed on Dec. 22, 2015.

(51) Int. Cl.
*B62B 3/14* (2006.01)
*A47F 9/04* (2006.01)

(56) References Cited

U.S. PATENT DOCUMENTS

| | | | |
|---|---|---|---|
| 477,235 A | 6/1892 | Timmerman | |
| 562,229 A | 6/1896 | Lenney | |
| 635,100 A | 10/1899 | Huebel | |
| 765,388 A | 7/1904 | Lanpher | |
| 797,871 A | 8/1905 | Smith | |
| 809,568 A | 1/1906 | Hulburt | |
| 873,188 A | 12/1907 | Thumann | |
| 890,693 A | 6/1908 | McCoy | |
| 893,930 A | 7/1908 | Lederman | |
| 896,443 A | 8/1908 | Dyett | |
| 936,736 A | 10/1909 | Porter et al. | |
| 995,798 A | 6/1911 | McCullough | |
| 1,055,745 A | 3/1913 | Harrison | |
| 1,069,108 A | 8/1913 | Buhl | |
| 1,252,740 A | 1/1918 | Thornblade | |
| 1,281,656 A | 10/1918 | Raschick | |
| 1,284,579 A | 11/1918 | Brown | |
| 1,653,393 A | 12/1927 | Cox | |
| 1,662,140 A | 3/1928 | Whitesides | |
| 2,240,629 A | 5/1941 | Smith | |
| 2,305,863 A | 12/1942 | Ginter | |
| 2,498,446 A | 2/1950 | Pawsat | |
| 2,563,679 A | 8/1951 | Hardy | |
| 2,603,438 A | 7/1952 | Adams | |
| 2,682,956 A | 7/1954 | Pike | |
| 2,797,058 A | 6/1957 | Packham | |
| 2,998,955 A | 9/1961 | Hertzog | |
| 3,133,660 A | 5/1964 | Roberts | |
| 3,266,742 A | 8/1966 | Pena | |
| 3,313,504 A | 4/1967 | Thorkild | |
| 3,339,745 A | 9/1967 | Sugerman | |
| D209,279 S | 11/1967 | Cohen | |
| 3,438,644 A | 4/1969 | Kaplan et al. | |
| 3,475,067 A | 10/1969 | Girard | |
| 3,747,298 A | 7/1973 | Lieberman | |
| 3,930,696 A | 1/1976 | Hight et al. | |
| 3,943,859 A | 3/1976 | Boone | |
| 3,995,803 A | 12/1976 | Uitz | |
| 4,048,754 A | 9/1977 | Laux | |
| 4,082,939 A | 4/1978 | Walters | |
| 4,106,617 A | 8/1978 | Boone | |
| 4,269,336 A | 5/1981 | Humlong | |
| 4,305,558 A | 12/1981 | Baker | |
| 4,354,643 A | 10/1982 | Kenner | |
| 4,367,819 A | 1/1983 | Lewis | |
| 4,376,502 A | 3/1983 | Cohen | |
| 4,403,807 A | 9/1983 | Wilkinson et al. | |
| 4,456,125 A | 6/1984 | Chap | |
| 4,480,810 A | 11/1984 | Hall | |
| 4,576,388 A | 3/1986 | Pope | |
| 4,583,753 A | 4/1986 | Economy | |
| 4,595,153 A | 6/1986 | Goetz | |
| 4,655,409 A | 4/1987 | Zima | |
| 4,682,782 A | 7/1987 | Mills | |
| 4,702,402 A | 10/1987 | Ferri | |
| 4,728,070 A | 3/1988 | Engelbrecht | |
| 4,838,504 A | 6/1989 | Bittenbinder | |
| D302,062 S | 7/1989 | Sable | |
| 4,881,577 A | 11/1989 | Stroh et al. | |
| 4,881,706 A | 11/1989 | Sedlik | |
| 4,968,047 A | 11/1990 | Ferris | |
| 4,974,799 A | 12/1990 | Palmer | |
| 4,997,149 A * | 3/1991 | Koch | B65F 1/06 220/495.06 |
| 4,998,647 A | 3/1991 | Sharp | |
| 4,998,694 A | 3/1991 | Barteaux | |
| 5,002,215 A | 3/1991 | Gregoire | |
| 5,005,791 A | 4/1991 | Lanzen | |
| 5,190,253 A | 3/1993 | Sable | |
| 5,362,077 A | 11/1994 | Adamson | |
| 5,366,123 A | 11/1994 | Range | |
| 5,385,318 A | 1/1995 | Rizzuto | |
| 5,390,443 A | 2/1995 | Emalfarb et al. | |
| 5,427,288 A | 6/1995 | Trubee | |
| 5,437,346 A | 8/1995 | Dumont | |
| 5,439,120 A | 8/1995 | Brozak | |
| 5,443,173 A | 8/1995 | Emery et al. | |
| D363,208 S | 10/1995 | Seidel | |
| 5,460,279 A | 10/1995 | Emery et al. | |
| 5,465,846 A | 11/1995 | Blyth et al. | |
| 5,503,297 A | 4/1996 | Frankel | |
| 5,513,823 A | 5/1996 | Bresnahan | |
| 5,531,366 A | 7/1996 | Strom | |
| 5,533,361 A | 7/1996 | Halpem | |
| 5,564,566 A | 10/1996 | Lamb | |
| 5,618,008 A | 4/1997 | Dearwester et al. | |
| 5,704,497 A | 1/1998 | Wyatt | |
| 5,727,721 A | 3/1998 | Guido et al. | |
| D396,372 S | 7/1998 | Goodman | |
| 5,836,486 A | 11/1998 | Ohsugi | |
| 5,875,902 A | 3/1999 | Emery et al. | |
| 5,915,584 A | 6/1999 | Sposit et al. | |
| D412,080 S | 7/1999 | Emery et al. | |
| 6,018,397 A | 1/2000 | Cloutier et al. | |
| 6,041,945 A | 3/2000 | Faraj | |
| 6,086,023 A | 7/2000 | Kerr et al. | |
| 6,109,462 A | 8/2000 | Emalfarb et al. | |
| 6,152,408 A | 11/2000 | O'Grady | |
| 6,155,521 A | 12/2000 | O'hanlon | |
| 6,170,679 B1 | 1/2001 | Frye | |
| 6,193,265 B1 | 2/2001 | Yemini | |
| 6,264,035 B1 | 7/2001 | Petrie | |
| 6,299,001 B1 | 10/2001 | Frolov et al. | |
| 6,305,572 B1 | 10/2001 | Daniels et al. | |
| D452,944 S | 1/2002 | Schmidt | |
| 6,341,704 B1 | 1/2002 | Michel, Jr. | |
| 6,364,266 B1 | 4/2002 | Garvin | |
| 6,374,577 B1 | 4/2002 | Ventura | |
| 6,390,422 B2 | 5/2002 | Banko | |
| 6,409,031 B1 | 6/2002 | Wynne | |
| D459,979 S | 7/2002 | Goodman | |
| 6,481,583 B1 | 11/2002 | Black et al. | |
| 6,543,638 B2 | 4/2003 | Wile | |
| 6,561,403 B1 | 5/2003 | Kannankeril et al. | |
| 6,601,759 B2 | 8/2003 | Fife et al. | |
| 6,606,411 B1 | 8/2003 | Loui et al. | |
| 6,607,229 B1 | 8/2003 | McIntosh | |
| 6,648,265 B2 | 11/2003 | Goldberg | |
| 6,655,537 B1 | 12/2003 | Lang et al. | |
| 6,685,075 B1 | 2/2004 | Kannankeril | |
| 6,726,145 B1 | 4/2004 | Kraus | |
| 6,726,156 B1 | 4/2004 | Scola | |
| D490,691 S | 6/2004 | Buss et al. | |
| 6,745,186 B1 | 6/2004 | Testa et al. | |
| 6,789,687 B2 | 9/2004 | Cramer | |
| 6,805,271 B2 | 10/2004 | Holden | |
| 6,810,149 B1 | 10/2004 | Squilla et al. | |
| 6,832,739 B1 | 12/2004 | Kraus | |
| 6,886,101 B2 | 4/2005 | Glazer et al. | |
| 6,937,989 B2 | 8/2005 | Mcintyre et al. | |
| 7,066,389 B2 | 6/2006 | Dickover et al. | |
| 7,077,612 B1 | 7/2006 | Giggle, III et al. | |
| 7,128,251 B1 | 10/2006 | Galle | |
| 7,172,092 B2 | 2/2007 | Yang et al. | |

(56) References Cited

U.S. PATENT DOCUMENTS

| | | |
|---|---|---|
| 7,177,820 B2 | 2/2007 | Mcintyre et al. |
| 7,182,210 B2 | 2/2007 | Metcalf |
| 7,192,035 B1 | 3/2007 | Lioce |
| D540,591 S | 4/2007 | Snell |
| 7,222,363 B2 | 5/2007 | Rice et al. |
| D552,901 S | 10/2007 | Wilfong, Jr. et al. |
| D571,518 S | 6/2008 | Waldman |
| D575,973 S | 9/2008 | Goodman et al. |
| 7,431,208 B2 | 10/2008 | Feldman et al. |
| 7,475,885 B2 | 1/2009 | Kovath |
| 7,530,537 B2 | 5/2009 | Kandah |
| 7,587,756 B2 | 9/2009 | Peart et al. |
| 7,610,717 B2 | 11/2009 | Luken et al. |
| 7,654,409 B2 | 2/2010 | Hoffman |
| 7,716,064 B2 | 5/2010 | Mcintyre et al. |
| D616,680 S | 6/2010 | Snider |
| 7,789,248 B1 | 9/2010 | Salerno et al. |
| 7,850,014 B2 | 12/2010 | Nguyen et al. |
| 7,887,068 B2 | 2/2011 | Ferguson |
| 8,002,127 B2 | 8/2011 | Ward et al. |
| 8,069,092 B2 | 11/2011 | Bryant |
| D650,209 S | 12/2011 | Snider |
| D654,737 S | 2/2012 | Guindi |
| 8,177,079 B2 | 5/2012 | Schwartzkopf et al. |
| D666,858 S | 9/2012 | Goodman |
| D667,250 S | 9/2012 | Goodman et al. |
| 8,292,094 B2 | 10/2012 | Morton |
| 8,336,800 B1 | 12/2012 | Lopez |
| 8,403,343 B1 | 3/2013 | Seawel |
| D689,282 S | 9/2013 | Lindeman |
| 8,572,712 B2 | 10/2013 | Rice et al. |
| D693,577 S | 11/2013 | Goodman et al. |
| 8,640,890 B2 | 2/2014 | Schiller |
| 8,668,207 B1 | 3/2014 | Gilliam |
| 8,746,640 B2 | 6/2014 | Broadley et al. |
| 8,814,039 B2 | 8/2014 | Bishop et al. |
| D713,663 S | 9/2014 | Pryor |
| 8,820,633 B2 | 9/2014 | Bishop et al. |
| 8,851,369 B2 | 10/2014 | Bishop et al. |
| D718,054 S | 11/2014 | Goodman et al. |
| D719,372 S | 12/2014 | Goodman et al. |
| 8,905,411 B1 | 12/2014 | Blanton |
| D720,538 S | 1/2015 | Goodman et al. |
| D728,255 S | 5/2015 | Guindi et al. |
| 9,199,656 B1 | 12/2015 | Tong et al. |
| D746,592 S | 1/2016 | Goodman et al. |
| D747,876 S | 1/2016 | Goodman et al. |
| D750,472 S | 3/2016 | Kuka |
| D751,763 S | 3/2016 | Goodman et al. |
| D784,721 S | 4/2017 | Goodman et al. |
| 9,623,995 B2 | 4/2017 | Tan |
| D785,333 S | 5/2017 | Goodman et al. |
| D785,369 S | 5/2017 | Goodman et al. |
| D787,303 S | 5/2017 | Garvin |
| 9,656,827 B2 | 5/2017 | Sudhir |
| 9,694,840 B2 | 7/2017 | Hendrick et al. |
| 9,737,141 B2 | 8/2017 | Johnson |
| D796,771 S | 9/2017 | Bacallao et al. |
| D803,032 S | 11/2017 | Jammehdiabadi |
| 9,844,283 B2 | 12/2017 | Bacallao |
| 10,173,708 B1 | 1/2019 | Bacallao |
| 10,179,599 B1 | 1/2019 | Lambrecht |
| 2001/0022333 A1 | 9/2001 | Banko |
| 2002/0060276 A1 | 5/2002 | Rosler |
| 2002/0145086 A1 | 10/2002 | Alvarado et al. |
| 2002/0170937 A1 | 11/2002 | Yeh et al. |
| 2002/0185510 A1 | 12/2002 | Holsclaw |
| 2002/0185513 A1 | 12/2002 | Morris |
| 2003/0000905 A1 | 1/2003 | Zidek |
| 2003/0042694 A1 | 3/2003 | Werner |
| 2003/0052464 A1 | 3/2003 | McGuire |
| 2003/0098326 A1 | 5/2003 | Wile |
| 2003/0121871 A1 | 7/2003 | Zadro |
| 2003/0198390 A1 | 10/2003 | Loui et al. |
| 2004/0000529 A1 | 1/2004 | Gladnick et al. |
| 2004/0000612 A1 | 1/2004 | Young |
| 2004/0026439 A1 | 2/2004 | Bolton |
| 2004/0075015 A1 | 4/2004 | Cain et al. |
| 2004/0104316 A1 | 6/2004 | Turvey |
| 2004/0124598 A1 | 7/2004 | Williams |
| 2004/0139398 A1 | 7/2004 | Testa et al. |
| 2004/0178298 A1 | 9/2004 | Kennard |
| 2004/0262385 A1 | 12/2004 | Blaeuer |
| 2005/0040615 A1 | 2/2005 | Frommherz |
| 2005/0056718 A1 | 3/2005 | Kamenstein |
| 2005/0205578 A1 | 9/2005 | Yeh |
| 2005/0284729 A1 | 12/2005 | LoRusso |
| 2006/0049591 A1 | 3/2006 | Pennell |
| 2006/0097467 A1 | 5/2006 | Solomon et al. |
| 2006/0124799 A1 | 6/2006 | Johnson |
| 2006/0226187 A1 | 10/2006 | Linker |
| 2007/0095769 A1 | 5/2007 | Jenkins |
| 2007/0176058 A1 | 8/2007 | Kohn |
| 2007/0186515 A1 | 8/2007 | Ruetten et al. |
| 2007/0204044 A1 | 8/2007 | Rice et al. |
| 2007/0261159 A1 | 11/2007 | Marks |
| 2007/0278359 A1 | 12/2007 | Kandah |
| 2008/0000910 A1 | 1/2008 | Gaillard |
| 2008/0001019 A1 | 1/2008 | Brown |
| 2008/0169253 A1 | 7/2008 | Vitale |
| 2008/0202851 A1 | 8/2008 | Schwenke et al. |
| 2008/0215448 A1 | 9/2008 | Boyle et al. |
| 2008/0215449 A1 | 9/2008 | Boyle et al. |
| 2008/0217342 A1 | 9/2008 | Cinque |
| 2008/0245684 A1 | 10/2008 | Yeatman |
| 2009/0078731 A1 | 3/2009 | Yi |
| 2009/0078815 A1 | 3/2009 | Tong et al. |
| 2009/0092342 A1 | 4/2009 | Rolim de Oliveira |
| 2009/0184162 A1 | 7/2009 | Rice et al. |
| 2009/0261050 A1 | 10/2009 | Curren |
| 2009/0319352 A1 | 12/2009 | Boyle et al. |
| 2009/0327087 A1 | 12/2009 | Beck et al. |
| 2010/0096514 A1 | 4/2010 | Adair et al. |
| 2010/0102014 A1 | 4/2010 | Yang |
| 2010/0123050 A1 | 5/2010 | Astwood |
| 2010/0148019 A1 | 6/2010 | Simhaee |
| 2010/0206825 A1 | 8/2010 | Johnston et al. |
| 2010/0218370 A1 | 9/2010 | Lin |
| 2010/0219219 A1 | 9/2010 | Svetina |
| 2010/0264101 A1 | 10/2010 | Ma |
| 2010/0289234 A1 | 11/2010 | Sonnendorfer et al. |
| 2011/0266092 A1 | 11/2011 | Marquis et al. |
| 2012/0125970 A1 | 5/2012 | Tsui |
| 2012/0167182 A1 | 6/2012 | Rice et al. |
| 2012/0169020 A1 | 7/2012 | Farrell |
| 2012/0305618 A1 | 12/2012 | Tan |
| 2012/0305619 A1 | 12/2012 | Tan |
| 2013/0026120 A1 | 1/2013 | Johnson |
| 2013/0037665 A1 | 2/2013 | Brasell et al. |
| 2013/0048689 A1 | 2/2013 | Ling |
| 2013/0092804 A1 | 4/2013 | Laitila et al. |
| 2013/0134181 A1 | 5/2013 | Helseth et al. |
| 2013/0264242 A1 | 10/2013 | Wojno |
| 2013/0330163 A1 | 12/2013 | Marsh |
| 2014/0048576 A1 | 2/2014 | Tan |
| 2014/0131506 A1 | 5/2014 | Clarkin |
| 2014/0144966 A1 | 5/2014 | Tan |
| 2014/0209651 A1 | 7/2014 | Wilfong |
| 2014/0367507 A1 | 12/2014 | Trampolski |
| 2016/0016752 A1 | 1/2016 | Helseth et al. |
| 2016/0096542 A1 | 4/2016 | Fukushima |
| 2016/0107668 A1 | 4/2016 | Robins |
| 2016/0183744 A1 | 6/2016 | Sadikov et al. |
| 2016/0227969 A1 | 8/2016 | Morris |
| 2016/0242605 A1 | 8/2016 | Heymann et al. |
| 2016/0270607 A1 | 9/2016 | Zeng |
| 2016/0300235 A1 | 10/2016 | Boyle et al. |
| 2016/0311454 A1* | 10/2016 | Hendrick .............. B62B 3/1464 |
| 2016/0367088 A1 | 12/2016 | Allard et al. |
| 2017/0066550 A1 | 3/2017 | Tsai |
| 2017/0172322 A1 | 6/2017 | Bacallao |
| 2017/0174242 A1 | 6/2017 | Bacallao |
| 2017/0174243 A1 | 6/2017 | Bacallao et al. |
| 2017/0197650 A1 | 7/2017 | Whistler |

(56) References Cited

U.S. PATENT DOCUMENTS

| | | |
|---|---|---|
| 2017/0259959 A1 | 9/2017 | Nilsson et al. |
| 2017/0267412 A1 | 9/2017 | Krause |
| 2017/0275126 A1 | 9/2017 | Sudhir |
| 2017/0325603 A1 | 11/2017 | Bacallao |
| 2017/0349200 A1 | 12/2017 | Winton et al. |
| 2018/0009460 A1 | 1/2018 | Bacallao et al. |
| 2018/0027994 A1 | 2/2018 | Bacallao et al. |
| 2018/0049564 A1 | 2/2018 | Bacallao |
| 2018/0093690 A1 | 4/2018 | Bacallao et al. |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 A1 | 6/2013 |

OTHER PUBLICATIONS

Non-Final Office Action in U.S. Appl. No. 15/653,768, dated Jan. 10, 2018; 31 pages.

Non-Final Office Action in U.S. Appl. No. 15/641,367, dated Jan. 12, 2018; 9 pages.

Non-Final Office Action in U.S. Appl. No. 15/703,307, dated Jan. 18, 2018; 9 pages.

Search Report in GB Patent Application No. GB1713283.8, dated Dec. 22, 2017; 4 pages.

"Universal Double Car Vehicle Hangers/Hooks Grocery Bags/Handbags/Umbrellas Organizer—Black," DealsMachine.com, accessed on Oct. 15, 2015; 2 pages.

"Over-the-Door Hook 3 Hook InterDesign," Target.com, accessed on Oct. 15, 2015; 4 pages.

JoshM "Smart Shopping Cart: Bagging Station Design," EECS398SmartShoppingCart.blogspot.in, Mar. 22, 2015; 2 pages.

"Clear Suspended Ceiling Hook," DoItBest.com, accessed on Oct. 14, 2015; 3 pages.

"Industrial T-shirt Bag Stand—Just like Grocery Stores," SmallBizWarehouse.com, accessed on Oct. 14, 2015; 4 pages.

"Dual L-Shape Flash Bracket Holder Mount for Canon Nikon Speedlikte DSLR Camera," Amazon.com, accessed on Jan. 5, 2016; 5 pages.

"InterDesign Classico Over-the-Door Tie and Belt Rack," HoldnStorage.com, accessed on Nov. 22, 2016; 2 pages.

"Small Matte 'So-Hooked' Rack," The Container Store, accessed on Nov. 22, 2016; 2 pages.

"POS Check Out Plastic Bag Holder Dispenser for Retail Supermarket Brand New!" Ebay.com, accessed on Nov. 17, 2016; 5 pages.

"Lot 2 Royston Plastic Grocery Bag Holder Dispenser Stand Point of Sale Shopping," TeraPeak.com, accessed on Nov. 17, 2016; 3 pages.

"Bag Holders," ULINE.mx, accessed on Nov. 17, 2016; 1 page.

"OEM Express Checkout Counter / Customized Supermarket Cash Register Stands Counters," Guangzhou ECO commerical Equipment Co., Ltd, SupermarketCheckoutCounters.com, accessed on Nov. 17, 2016; 3 pages.

"Retrospec Bicycles Detachable Steel Half-Mesh Apollo Bike Basket with Handles," Retrospec Bicycles, Amazon.com, accessed on Apr. 27, 2017; 1 page.

"Transport trolley / waste / with waste bag holder / 1-bag WASTY 70 LT Francehopital," MedicalExpo.com, accessed on Apr. 25, 2017; 25 pages.

Jackie, "How to Make a Clothespin Bag," TheHappyHousewife.com, Apr. 19, 2012; 14 pages.

"Gluman Combo of 12 Sparkle Clothes Hangers (Yellow) and 6 Plastic Kitchen Storage Containers Blue (125 ml)," PAYtm.com, accessed on Apr. 24, 2017; 3 pages.

"Pack-N-Tote Reusable Grocery Cart Bag, Hooks Directly to the Shopping Cart, Black," Six Mour Creations, Amazon.com, accessed on Apr. 24, 2017; 5 pages.

"Toygully 12 Pack Solid Steel Finish Hangers with Clips strong," PAYtm.com, accessed on Apr. 26, 2017; 3 pages.

Search Report in United Kingdom Patent Application No. GB1621567.5, dated Jun. 14, 2017; 5 pages.

Notice of Allowance in U.S. Appl. No. 29/572,901, dated May 17, 2017; 9 pages.

"Actionclub Wall Mount Grocery Bag Dispenser Kitchen Plastic Recycle Storage Box Garbage Bag Orangizer Container Holder," AliExpress.com, accessed on Jun. 14, 2017; 3 pages.

"BG001-0111 : Bag Dispenser—Single," BowmanDispensers.com, accessed on Jun. 14, 2017; 8 pages.

"Axis Chrome Over Cabinet Plastic Bag Holder," Organizelt.com, accessed on Jun. 14, 2017; 2 pages.

"Simplehuman Stainless Steel Grocery Bag Holder," ContainerStore.com, accessed on Jun. 14, 2017; 2 pages.

Search Report in UK Patent Application No. GB1621562.6, dated Jun. 14, 2017; 4 pages.

Search Report in UK Patent Application No. GB1621564.2 dated Jun. 15, 2017; 5 pages.

Search Report in UK Patent Application No. GB1702839.0 dated Jun. 14, 2017; 5 pages.

Notice of Allowance in U.S. Appl. No. 15/653,768, dated May 2, 2018; 12 pages.

Notice of Allowance in U.S. Appl. No. 15/703,307, dated May 23, 2018; 5 pages.

Non-Final Office Action in U.S. Appl. No. 15/383,126, dated May 16, 2018; 6 pages.

Notice of Allowance in U.S. Appl. No. 15/641,367, dated Jun. 7, 2018; 5 pages.

Non-Final Office Action in U.S. Appl. No. 15/383,151, dated May 25, 2018; 13 pages.

Non-Final Office Action in U.S. Appl. No. 15/383,170, dated Jul. 3, 2018; 10 pages.

Notice of Allowance in U.S. Appl. No. 16/053,248 dated Oct. 11, 2018; 7 pages.

Notice of Allowance in U.S. Appl. No. 15/383,170 dated Dec. 6, 2018; 5 pages.

Notice of Allowance in U.S. Appl. No. 15/383,151 dated Dec. 21, 2018; 9 pages.

Final Office Action in U.S. Appl. No. 15/383,126, dated Nov. 14, 2018; 6 pages.

Restriction Requirement in U.S. Appl. No. 15/433,365 dated Dec. 31, 2018; 5 pages.

Non-Final Office Action in U.S. Appl. No. 15/433,388 dated Dec. 31, 2018; 6 pages.

Notice of Allowance in U.S. Appl. No. 15/383,126 dated Jan. 15, 2019; 5 pages.

Non-Final Office Action in U.S. Appl. No. 15/433,365 dated Feb. 5, 2019; 8 pages.

Restriction Requirement in U.S. Appl. No. 15/676,143 dated Apr. 1, 2019; 6 pages.

Non-Final Office Action in U.S. Appl. No. 15/676,218 dated Feb. 22, 2019; 12 pages.

Notice of Allowance and Fees Due in U.S. Appl. No. 15/433,365, dated Apr. 18, 2019; 5 pages.

Notice of Allowance and Fees Due in U.S. Appl. No. 15/433,388, dated May 21, 2019; 5 pages.

(56) References Cited

OTHER PUBLICATIONS

Final Office Action in U.S. Appl. No. 15/676,218, dated Jul. 25, 2019; 7 pages.
Restriction Requirement in U.S. Appl. No. 16/102,954 dated Jul. 3, 2019; 7 pages.
Notice of Allowance in U.S. Appl. No. 16/239,064 dated Aug. 15, 2019; 13 pages.

* cited by examiner

SHOPPING CART BAGGING STATION AND METHOD OF FORMING THE SAME

CROSS REFERENCE TO RELATED APPLICATIONS

This application is a division of U.S. patent application Ser. No. 15/383,170, filed Dec. 19, 2016 to Applicant Walmart Apollo, LLC, and entitled "Shopping Cart Bagging Station and Method of Forming the Same," which claims priority to U.S. provisional patent application Ser. No. 62/270,785, filed Dec. 22, 2015 to Applicant Wal-Mart Stores Inc., and entitled "Shopping Cart Bagging Station and Method of Forming the Same", U.S. provisional patent application Ser. No. 62/270,813, filed Dec. 22, 2015 to Applicant Wal-Mart Stores Inc., and entitled "Shopping Cart Bagging Station and Method of Forming the Same", U.S. provisional patent application Ser. No. 62/270,827, filed Dec. 22, 2015 to Applicant Wal-Mart Stores Inc., and entitled "Shopping Cart Bagging Station and Method of Forming the Same", U.S. provisional patent application Ser. No. 62/298,011, filed Feb. 22, 2016 to Applicant Wal-Mart Stores Inc., and entitled "Shopping Cart Bagging Station and Method of Forming the Same", U.S. provisional patent application Ser. No. 62/298,017, filed Feb. 22, 2016 to Applicant Wal-Mart Stores Inc., and entitled "Shopping Cart Bagging Station and Method of Forming the Same", U.S. provisional patent application Ser. No. 62/377,135, filed Aug. 19, 2016 to Applicant Wal-Mart Stores Inc., and entitled "Shopping Cart Bagging Station and Method of Forming the Same", U.S. provisional patent application Ser. No. 62/377,143, filed Aug. 19, 2016 to Applicant Wal-Mart Stores Inc., and entitled "Shopping Cart Bagging Station and Method of Forming the Same", and U.S. provisional patent application Ser. No. 62/402,475, filed Sep. 30, 2016 to Applicant Wal-Mart Stores Inc., and entitled "Shopping Cart Bagging Station and Method of Forming the Same", which are included entirely herein by reference.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are now able to pay for and bag their products as they shop, and these actions can occur at locations besides checkout stations. There is a need for bagging stations in locations in retail stores besides at the checkout station.

Accordingly, what is needed is a bagging station that can be mounted in a shopping cart, so that customers can bag their purchases as they shop.

DETAILED DESCRIPTION OF EMBODIMENTS OF THE INVENTION

Figure 1:
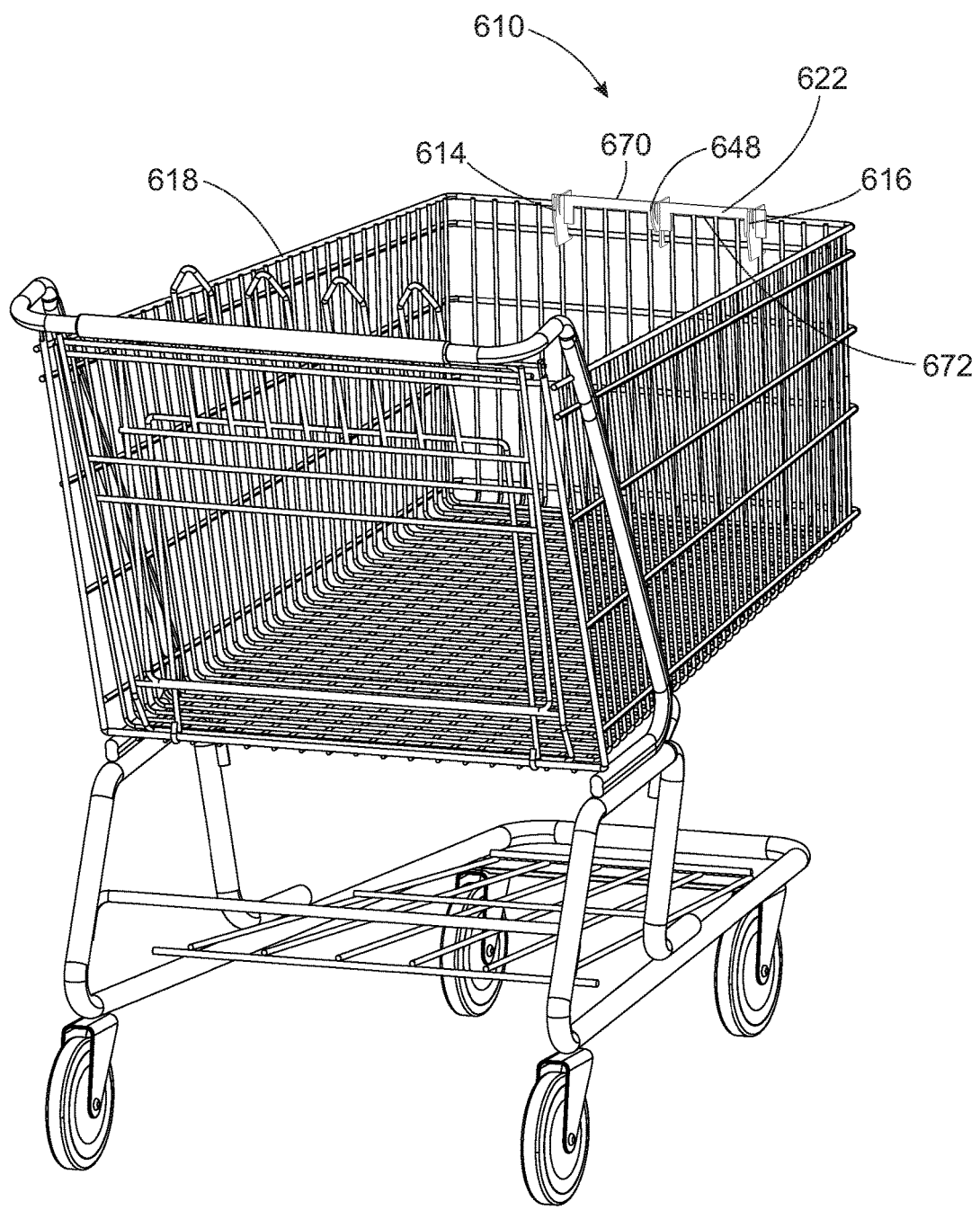
FIG. 1 shows a perspective view of a shopping cart bagging station coupled to a shopping cart.

Disclosed herein are embodiments of an invention related to retail store fixtures, and, more specifically, to a bagging station that couples to a shopping cart. The disclosed shopping cart bagging station can be used by customers to bag their purchases as they shop. The shopping cart bagging station can be made from recyclable materials and is lightweight and portable. The disclosed shopping cart bagging station is formed of elements that are each cut from a sheet of rigid material such as cardboard. The shopping cart bagging station can be supplied as a kit, where the kit includes the sheet of rigid material, with each of the shopping cart elements outlined with perforated lines in the sheet of rigid material. The shopping cart bagging station is constructed by separating the shopping cart bagging station elements from the sheet of rigid material by separating the perforated lines, and then fitting the shopping cart bagging station elements together to form the shopping cart bagging station. The shopping cart bagging station elements fit together with slot joints formed by coupling slots in the elements. The shopping cart bagging station can be provided to the customer in kit form. The customer can separate the shopping cart bagging station elements and construct the shopping cart bagging station themselves.

The disclosed shopping cart bagging station includes a support bar, a first and a second mounting structure, and a bag holder hook. The shopping cart bagging station couples to a shopping cart, holds a plurality of shopping bags, and dispenses the shopping bags one at a time as products are placed in a shopping bag. The first and the second mounting structure couple to the support bar, and are configured to couple the shopping cart bagging station to a shopping cart. The bag holder hook extends from the support bar, and holds the plurality of shopping bags. The first and second shopping cart mounting structures include a first and a second shopping bag handle arm, where each of the first and the second shopping bag handle arms hold a handle of a shopping bag so the shopping bag is held open and items can be placed in the shopping bag. The shopping cart bagging station can be mounted in various locations on a shopping cart, making it easy and convenient for a customer to carry and load a plurality of shopping bags as they shop. The shopping cart bagging station can be provided by the retail store for customer use, much like the use of the shopping cart. Or, in some embodiments, the shopping cart bagging station is brought into the store by the customer. The disclosed shopping cart bagging station provides a means for a customer to load purchases into bags as they shop, instead of having to bag their purchases at a checkout station.

Disclosed herein is a shopping cart bagging station that includes a means to hold a plurality of shopping bags, and a means to removeably couple the means to hold a plurality of shopping bags to a shopping cart. The shopping cart bagging station also includes a means to hold one of the plurality of shopping bags open for insertion of items into the shopping bag. In some embodiments, the means to hold the plurality of shopping bags and the means to removeably couple the means to hold the plurality of shopping bags to a shopping cart are each stamped from a single rigid sheet of material. In some embodiments, the means to hold a plurality of shopping bags and the means to hold one of the plurality of shopping bags open for insertion of items are outlined with perforated lines in the sheet of rigid material. The material can be cardboard, plastic, wood, or other lightweight material, and recyclable so the shopping cart bagging station is lightweight, easily carried, and can be recycled at its end of life. The means to hold the plurality of shopping bags, the means to hold one of the shopping bags open, and the means to removeably couple the means to hold the plurality of shopping bags to a shopping cart can take many different forms. The examples shown and described in this document are not meant to be limiting, and many other variations are possible in light of the teachings in this document.

Figure 2:
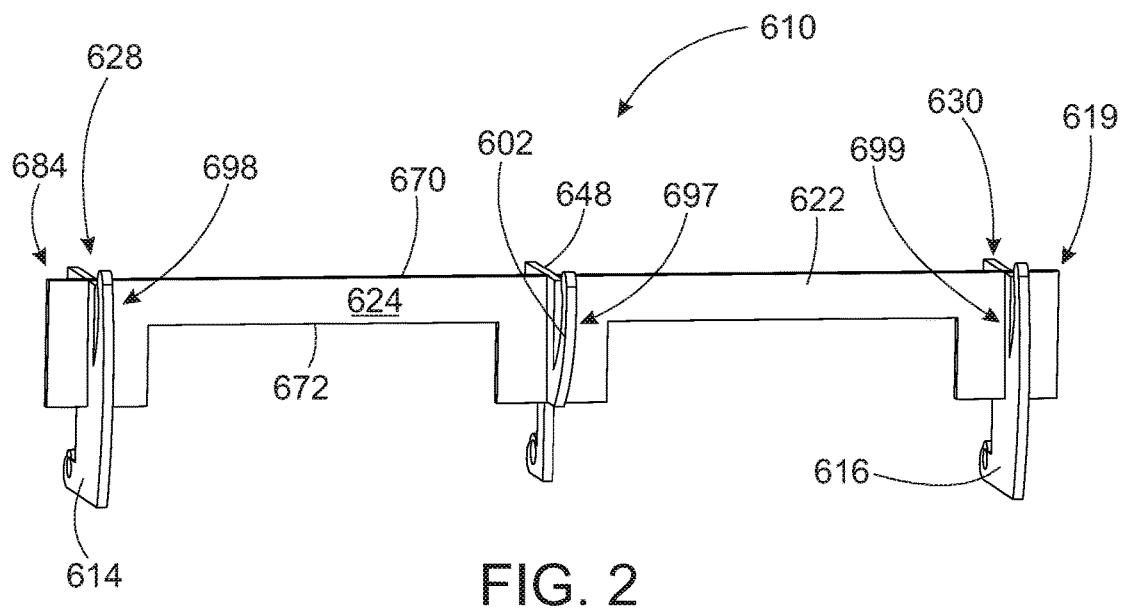
FIG. 2 shows a front perspective view of a shopping cart bagging station.
Figure 3:
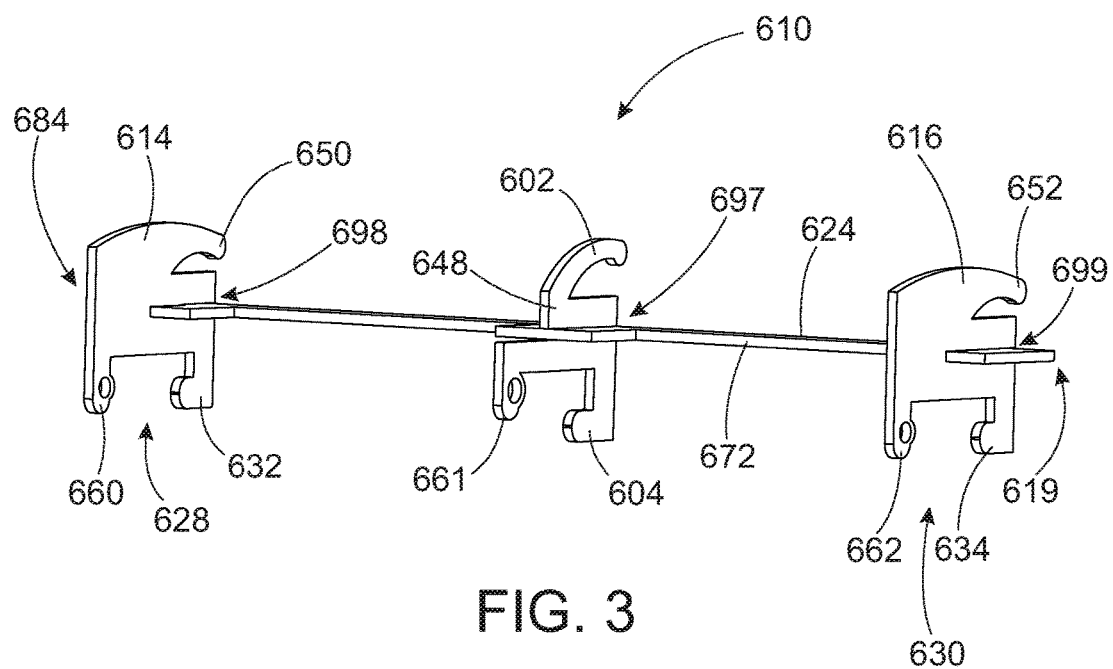
FIG. 3 shows a bottom perspective view of the shopping cart bagging station of FIG. 2.
Figure 4:
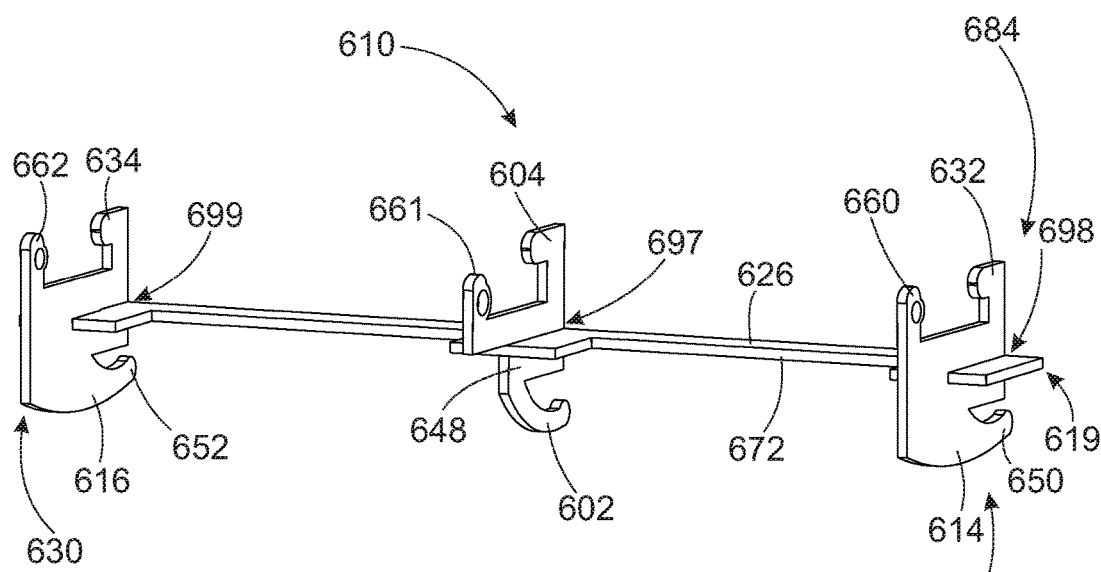
FIG. 4 shows an additional bottom perspective view of the shopping cart bagging station of FIG. 2.
Figure 5:
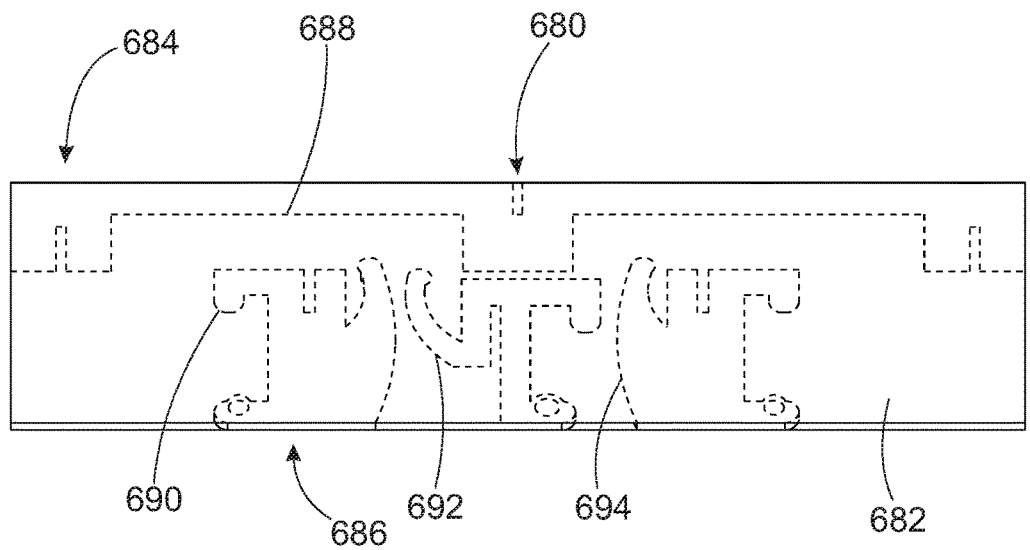
FIG. 5 shows a front perspective view of a shopping cart bagging station kit.
Figure 6:
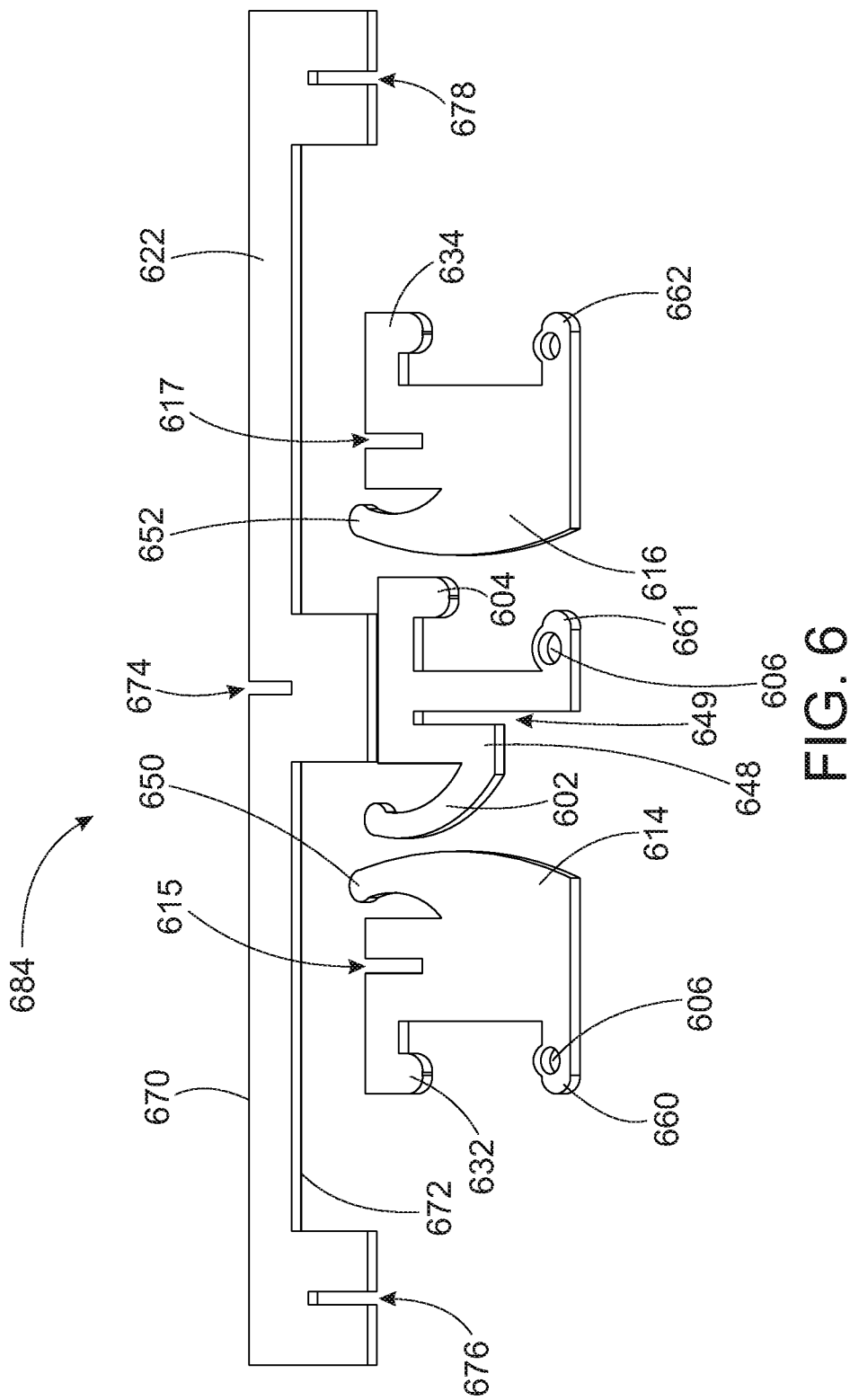
FIG. 6 shows a front perspective view of a plurality of shopping cart bagging station elements.

FIG. 1 through FIG. 6 show an embodiment of a shopping cart bagging station 610. FIG. 1 shows shopping cart bagging station 610 coupled to a shopping cart 618. FIG. 2 shows a front perspective view of shopping cart bagging station 610. FIG. 3 shows a bottom perspective view of shopping cart bagging station 610. FIG. 4 shows an additional bottom perspective view of shopping cart bagging station 610. FIG. 5 shows a sheet of rigid material 682 with a plurality of shopping cart bagging station elements 684 outlined with a plurality of perforated lines 686 in sheet of rigid material 680. FIG. 6 shows plurality of shopping cart bagging station elements 684 which comprise shopping cart bagging station 610.

Shopping cart bagging station 610 couples to a shopping cart 618 as shown in FIG. 1 to provide customers a means to bag their items as they shop. A plurality of shopping bags is hung from shopping cart bagging station 610. Shopping cart bagging station 610 holds and dispenses the plurality of shopping bags that are hung from shopping cart bagging station 610. One bag at a time is opened and filled with items. Once the bag is full, the shopping bag is removed from shopping cart bagging station 610. If further items need to be bagged, an additional shopping bag hanging from shopping cart bagging station 610 is opened and filled with items. Shopping cart bagging station 610 allows customers a way to bag their items as they shop so the customer is not required to visit a checkout station before exiting the store. The customer can electronically purchase items, bag their items themselves, and exit the store without needing additional cashier or bagging assistance. This simplifies the shopping experience for the customer and reduces shopping time.

Shopping cart bagging station 610 is formed of and includes a plurality of individual shopping cart bagging station elements 684 (see FIG. 6) coupled together using a plurality of slot joints 619, as shown in FIG. 2 through FIG. 4. In this embodiment, plurality of shopping cart bagging station elements 684 includes four elements, a support bar 622, a bag holder hook 648 coupled to support bar 622, a first shopping cart mounting structure 614 coupled to support bar 622, and a second shopping cart mounting structure 616 coupled to support bar 622. These items are coupled together to form shopping cart bagging station 610 as shown in FIG. 2 through FIG. 4. In some embodiments, shopping cart bagging station 610 includes more than four elements. In this embodiment bag holder hook 648 is the means to hold a plurality of shopping bags, but this is not meant to be limiting. First shopping cart mounting structure 614, and second shopping cart mounting structure 616 are the means to couple the means to hold the plurality of shopping bags to a shopping cart, but this is not meant to be limiting. First shopping cart mounting structure 614, and second shopping cart mounting structure 616 are also the means to hold one of the plurality of shopping bags open for insertion of items, but this is not meant to be limiting. The means to hold a plurality of shopping bags, the means to couple the means to hold the plurality of shopping bags, and the means to hold one of the plurality of shopping bags open can take many different forms.

Shopping cart bagging station 610 holds and dispenses a plurality of shopping bags, often plastic shopping bags. Bag holder hook 648 holds the plurality of shopping bags. A first and a second shopping bag handle holder arm 650 and 652 as shown in FIG. 3 and FIG. 4 hold the handles of one or more than one of the plurality of shopping bags. When a user wishes to fill a first one of the plurality of shopping bags, a bag is pulled open from bag holder hook 648 and the handles are held by first and second shopping bag handle holder arms 650 and 652. This leaves the shopping bag open and hanging by its handles from first and second shopping bag handle holder arms 650 and 652. First and second shopping bag handle arms 650 and 652 support the bag and the items placed in the bag. Once the user is done filling the bag, it is removed from shopping cart bagging station 610 and the process is repeated with a next one of the plurality of shopping bags until all items are bagged.

Referring to FIG. 2 through FIG. 5, support bar 622 includes a front surface 624 (FIG. 2), a rear surface 626 (FIG. 4), a first end 628 and a second end 630 opposing first end 628, as shown in FIG. 2 through FIG. 4. Support bar 622 also includes a top edge 670 (FIG. 2) and a bottom edge 672 (FIG. 3 and FIG. 4). Support bar 622 in this embodiment also includes a first slot 674, a second slot 676, and a third slot 678, as shown in FIG. 6. First slot 674 extends into support bar 622 from top edge 670. Second and third slot 676 and 678 extend into support bar 622 from bottom edge 672, as shown in FIG. 6. First slot 674, second slot 676, and third slot 678 are used to couple bag holder hook 648 and first and second shopping cart mounting structure 614 and 616 to support bar 622, as explained herein.

Shopping cart bagging station 610 includes bag holder hook 648. FIG. 2, FIG. 3, and FIG. 4 show bag holder hook 648 coupled to support bar 622. FIG. 6 illustrates bag holder hook 648 separated from support bar 622. Bag holder hook 648 includes a bag holder hook slot 649, and a third cart coupling hook 604 as shown in FIG. 6. Bag holder hook 648 couples to support bar 622 by sliding bag holder hook slot 649 into first slot 674, forming first slot joint 697, as shown in FIG. 2, FIG. 3, and FIG. 4. In this way, bag holder hook 648 is removeably coupled to support bar 622 using first slot 674, and bag holder hook slot 649. Bag holder hook 648 in this embodiment couples to support bar 622 approximately halfway between first end 628 and second end 630 of support bar 622. Bag holder hook 648 in this embodiment includes a bag hook 602 that extends from front surface 624 when bag holder hook 648 is coupled to support bar 622. Bag holder hook 648 with bag hook 602 is a means to hold the plurality of shopping bags. Bag hook 602 points towards top edge 670 of support bar 622 so that the plurality of shopping bags can be hung on bag hook 602. Bag holder hook 648 also includes a third cart coupling hook 604 (first and second cart coupling hooks 632 and 634 described below) that extends from rear surface 626 when bag holder hook 648 is coupled to support bar 622. Third cart coupling hook 604 couples shopping cart bagging station 610 to shopping cart 618. Third cart coupling hook 604 is a means to couple bag holder hook 648 and bagging station 610 to shopping cart 618. Bag holder hook 648 also includes a third post 661 (first and second posts 660 and 662 described below) that extends from rear surface 626 when bag holder hook 648 is coupled to support bar 622. Third post 661 helps keep third cart coupling hook 604 coupled to a rod of shopping cart 618. Bag holder hook 648 can take many different forms. Any form that allows bag holder hook 648 to hold a plurality of shopping bags can be used.

Shopping cart bagging station 610 also includes first and second shopping cart mounting structures 614 and 616, as shown in FIG. 2, FIG. 3, FIG. 4, and FIG. 6. First and second shopping cart mounting structures 614 and 616 each removeably couple to support bar 622, and provide both the means to couple shopping cart bagging station 610 to a shopping cart, and the means to hold one of the plurality of shopping bags open.

First shopping cart mounting structure 614 includes a first mounting structure slot 615, first handle holder arm 650, first cart coupling hook 632, and first post 660, as can best be seen in FIG. 6. First shopping cart mounting structure 614 removeably couples to support bar 622 by sliding first mounting structure slot 615 into second slot 676 of support bar 622, forming second slot joint 698 (FIG. 2, FIG. 3). Thus, first mounting structure slot 615 couples to second slot 676 to form second slot joint 698. First shopping cart mounting structure 614 couples to support bar 622 such that first handle holder arm 650 extends from front surface 624 at first end 628 (FIG. 3), and first cart coupling hook 632 and first post 660 extend from rear surface 626 (FIG. 4) at first end 628. First handle holder arm 650 holds a handle of a shopping bag, which helps hold the shopping bag open while items are placed in the shopping bag. First cart coupling hook 632 hooks onto a rod of shopping cart 618, coupling shopping cart bagging station 610 to the shopping cart. First post 660 helps guide the shopping cart rod into first cart coupling hook 632, and helps hold shopping cart bagging station 610 coupled to the shopping cart. Thus, first handle holder arm 650 is a means to hold one of the plurality of shopping bags open, and both first cart coupling hook 632 and first post 660 are means to couple shopping cart bagging station 610 to a shopping cart. First handle holder arm 650 can take many different forms other than those shown in order to hold a handle of a shopping bag. First cart coupling hook 632 can take many different forms in order to couple shopping cart bagging station 610 to a shopping cart. First cart coupling hook 632 can take different forms depending on the structure of the shopping cart to be coupled to, for example. First cart coupling hook 632 can take any form that couples the means to hold the plurality of shopping bags to a shopping cart.

Second shopping cart mounting structure 616 includes a second mounting structure slot 617, second handle holder arm 652, second cart coupling hook 634, and second post 662, as can be best seen in FIG. 6. Second shopping cart mounting structure 616 removeably couples to support bar 622 by sliding second mounting structure slot 617 into third slot 678, forming third slot joint 699 (FIG. 2, FIG. 4). Thus, second mounting structure slot 617 couples to third slot 678 to form third slot joint 699. Second shopping cart mounting structure 616 couples to support bar 622 such that second handle holder arm 652 extends from front surface 624 at second end 630 (FIG. 3), and second cart coupling hook 634 and second post 662 extend from rear surface 626 (FIG. 4) at second end 630. Second handle holder arm 652 holds a handle of a shopping bag, which helps hold the shopping bag open while items are placed in the shopping bag. Second cart coupling hook 634 hooks onto a rod of shopping cart 618, coupling shopping cart bagging station 610 to shopping cart 618. Second post 662 helps guide the shopping cart rod into second cart coupling hook 634, and helps hold shopping cart bagging station 610 coupled to shopping cart 618. Thus, second handle holder arm 652 is a means to hold one of the plurality of shopping bags open, and both second cart coupling hook 634 and second post 662 are means to couple shopping cart bagging station 610 to shopping cart 618. Second handle holder arm 652 can take many different forms other than those shown, in order to hold a handle of a shopping bag. Second cart coupling hook 634 can take many different forms in order to couple shopping cart bagging station 610 to a shopping cart. Second cart coupling hook 634 can take different forms depending on the structure of the shopping cart to be coupled to, for example. Second cart coupling hook 634 can take any form that couples the means to hold the plurality of shopping bags to a shopping cart.

First post 660, second post 662, and third post 661 each have a hole 606 (FIG. 6). Holes 606 are put in first, second, and third post 660, 662, and 661 so that first and second cart coupling structures 614 and 616, and bag holder hook 648 can each be coupled to support bar 622 or another fixture by a string, strap, or tie. Holes 606 are provided to help keep plurality of bagging station elements 684 from being separated from each other.

With cart coupling hooks 604, 632 and 634 coupling shopping cart bagging station 610 to shopping cart 618, shopping cart bagging station 610 can be used by a customer to dispense bags as needed while the customer shops. Shopping cart bagging station 610 can be coupled to any location of shopping cart 618. FIG. 1 shows shopping cart bagging station 610 mounted to the interior front of shopping cart 618, but this is not meant to be limiting. Shopping cart bagging station 610 can be coupled to the interior or exterior of shopping cart 618. Shopping cart bagging station 610 can be coupled to the front, sides, rear, edges, or bottom of shopping cart 618.

FIG. 5 illustrates a shopping cart bagging station kit 680. Shopping cart bagging station kit 680 includes a plurality of perforated lines 686 that outline and define plurality of shopping cart bagging station elements 684. FIG. 6 illustrates plurality of shopping cart bagging station elements 684 once plurality of perforated lines 686 are separated. By designing plurality of shopping cart bagging station elements 684 to each be cut from a sheet of rigid material 682, shopping cart bagging station 610 can be provided to a customer or other user by providing shopping cart bagging station kit 680 to the user. Sheet of rigid material can be cardboard, metal, wood, or plastic, for example but not by way of limitation. Shopping cart bagging station kit 680 includes sheet of rigid material 682. Sheet of rigid material 682 includes plurality of perforated lines 686. Plurality of perforated line 686 outline plurality of shopping cart bagging station elements 684. By separating plurality of perforated lines 686, plurality of shopping cart elements 684 are separated from each other and from sheet of rigid material 682. Plurality of shopping cart elements 684 as separated from sheet of rigid material by separating perforated lines 686 as shown in FIG. 6. Plurality of shopping cart bagging station elements 684 are assembled to form shopping cart bagging station 610 by coupling bag holder hook 648 to support bar 622, and coupling first and second shopping cart mounting structure 614 and 616 to support bar 622. Plurality of shopping cart elements 684 can be separated by hand in some embodiments, and assembled by hand into shopping cart bagging station 610. This makes it easy for a user to transform shopping cart bagging station kit 680 into shopping cart bagging station 610. By designing shopping cart bagging station 610 to be formed from shopping cart bagging station kit 680, a retail store can cheaply and easily provide shopping cart bagging station kits 680 to their customers or stores, where they can be easily transformed into shopping cart bagging stations 610. By forming sheet of rigid material 682 from recyclable material, shopping cart bagging station 610 can be recycled at its end of life.

Disclosed is a method of forming a shopping cart bagging station that includes perforating a plurality of lines in a sheet of rigid material, wherein each one of the plurality of lines defines one of a plurality of shopping cart bagging station elements, and wherein the plurality of shopping cart bagging station elements fit together to form the shopping cart bagging station once the plurality of perforated lines are separated. In some embodiments the method includes separating the plurality of shopping cart bagging station elements from the sheet of rigid material. In some embodiments the method includes separating by hand the plurality of shopping cart bagging station elements from the sheet of rigid material. In some embodiments the method includes assembling the plurality of shopping cart bagging station elements into the shopping cart bagging station. In some embodiments the method includes assembling by hand the plurality of shopping cart bagging station elements into the shopping cart bagging station.

In some embodiments, the method includes designing a shopping cart bagging station comprising a plurality of shopping cart bagging station elements, wherein each one of the plurality of shopping cart bagging station elements is configured to be cut from a sheet of rigid material. In some embodiments, the plurality of shopping car bagging station elements includes no more than four elements. In some embodiments, the shopping cart bagging station elements include a support bar, a bag holder hook, a first shopping cart mounting structure, and a second shopping cart mounting structure. In some embodiments, the method includes designing a plurality of shopping cart bagging station elements that fit together using a plurality of slot joints.

Disclosed is a method of forming a shopping cart bagging station kit that includes perforating a plurality of lines in a sheet of rigid material, wherein each one of the plurality of lines defines one of a plurality of shopping cart bagging station elements. The plurality of shopping cart bagging station elements fit together to form a shopping cart bagging station once the plurality of perforated lines are separated. In some embodiments, the method includes designing a shopping cart bagging station comprising a plurality of shopping cart bagging station elements, wherein each one of the plurality of shopping cart bagging station elements is configured to be cut from a sheet of rigid material. In some embodiments, the plurality of shopping car bagging station elements includes no more than four elements. In some embodiments, the shopping cart bagging station elements include a support bar, a bag holder hook, a first shopping cart mounting structure, and a second shopping cart mounting structure. In some embodiments, the method includes designing a plurality of shopping cart bagging station elements that fit together using a plurality of slot joints.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A method of forming a shopping cart bagging station, the method comprising perforating a plurality of lines in a sheet of rigid material, wherein each one of the plurality of lines defines one of a plurality of shopping cart bagging station elements, and wherein the plurality of shopping cart bagging station elements fit together using a plurality of slot joints to form the shopping cart bagging station once the plurality of perforated lines are separated, wherein the plurality of shopping cart bagging station elements comprise:
   a support bar;
   a bag holder hook;
   a first shopping cart mounting structure; and
   a second shopping cart mounting structure.

2. The method of claim 1, wherein the plurality of shopping cart bagging station elements comprises no more than four elements.

3. The method of claim 1, further comprising separating the plurality of shopping cart bagging station elements from the sheet of rigid material.

4. The method of claim 3, wherein the separating is by hand the plurality of shopping cart bagging station elements from the sheet of rigid material.

5. The method of claim 4, further comprising assembling by hand the plurality of shopping cart bagging station elements into the shopping cart bagging station.

6. The method of claim 3, wherein the separating is by cutting the plurality of shopping cart bagging station elements from the sheet of rigid material.

7. The method of claim 6, further comprising assembling by hand the plurality of shopping cart bagging station elements into the shopping cart bagging station.

8. The method of claim 3, wherein the support bar comprises:
   a front side;
   a rear side;
   a top edge;
   a bottom edge;
   a first slot extending into the support bar from the top edge;
   a second slot extending into the support bar from the bottom edge; and
   a third slot extending into the support bar from the bottom edge.

9. The method of claim 8, further comprising removeably coupling the bag holder hook to the support bar using the first slot.

10. The method of claim 9, further comprising removeably coupling the first shopping cart mounting structure to the support bar using the second slot.

11. The method of claim 10, further comprising removeably coupling a second shopping cart mounting structure to the support bar using the third slot.

\* \* \* \* \*